United States Patent
Smith

(10) Patent No.: US 9,222,598 B1
(45) Date of Patent: Dec. 29, 2015

(54) ADJUSTABLE VALVE WRENCH

(71) Applicant: Peter Smith, Burleson, TX (US)

(72) Inventor: Peter Smith, Burleson, TX (US)

(*) Notice: Subject to any disclaimer, the term of this patent is extended or adjusted under 35 U.S.C. 154(b) by 224 days.

(21) Appl. No.: 14/044,025

(22) Filed: Oct. 2, 2013

(51) Int. Cl.
*F16K 31/60* (2006.01)
*F16K 31/46* (2006.01)
*B25B 13/14* (2006.01)
*B25B 13/18* (2006.01)
*B25B 13/20* (2006.01)

(52) U.S. Cl.
CPC ............... *F16K 31/60* (2013.01); *F16K 31/46* (2013.01); *B25B 13/14* (2013.01); *B25B 13/18* (2013.01); *B25B 13/20* (2013.01)

(58) Field of Classification Search
CPC ........ B25B 13/12; B25B 13/14; B25B 13/18; B25B 13/20; B25B 13/22; B25B 13/24; B25B 13/48; B25B 13/56; F16K 31/46; F16K 31/60
USPC .............. 251/291–293; 81/119, 124.2, 124.5, 81/176.15, 176.3, 186; 294/100, 119.1, 294/902
See application file for complete search history.

(56) References Cited

U.S. PATENT DOCUMENTS

| | | | |
|---|---|---|---|
| 1,126,678 A * | 2/1915 | Apfeld | 81/116 |
| 2,086,722 A | 7/1937 | Matuella | |
| 2,539,262 A | 10/1946 | Moore | |
| 2,682,189 A | 7/1950 | Bergman | |
| 2,920,517 A | 1/1960 | Willey | |
| 3,046,811 A | 1/1960 | Seubert | |
| 3,482,476 A * | 12/1969 | Tanksley | 81/3.42 |
| 4,715,252 A | 12/1987 | Pella | |
| 4,991,469 A | 2/1991 | Pella | |
| 5,088,472 A | 2/1992 | Fakhrai | |
| 5,174,138 A * | 12/1992 | Shen | 70/209 |
| 5,412,963 A * | 5/1995 | Carlo et al. | 70/209 |
| 5,428,853 A * | 7/1995 | Menke et al. | 7/138 |
| 5,823,076 A * | 10/1998 | Binkowski | 81/127 |
| 6,058,749 A * | 5/2000 | Rekemeyer | 70/226 |
| 7,637,183 B2 * | 12/2009 | Alvarado | 81/120 |
| 7,798,280 B2 * | 9/2010 | Simoni et al. | 180/403 |
| 7,954,572 B2 * | 6/2011 | Sorg et al. | 180/6.3 |
| 8,118,525 B2 * | 2/2012 | Long et al. | 410/151 |
| 8,505,416 B1 * | 8/2013 | Phelps, Jr. | 81/90.4 |
| 2003/0047041 A1 | 3/2003 | Trout | |
| 2004/0074268 A1 * | 4/2004 | Wu | 70/209 |

* cited by examiner

*Primary Examiner* — Matthew W Jellett
(74) *Attorney, Agent, or Firm* — James E. Walton

(57) ABSTRACT

A valve wrench and method to rotate a valve. The valve wrench includes a handle extension, an insert configured to adjustably receive the handle extension, a sleeve configured to adjustable receive the insert, and a locking mechanism configured to interlock the insert relative to the sleeve.

16 Claims, 3 Drawing Sheets

ADJUSTABLE VALVE WRENCH

BACKGROUND

1. Field of the Invention

The present application relates generally to handles, and more specifically, to an adjustable valve wrenches.

2. Description of Related Art

Valve wrenches are well known in the art for effectively attaching to and rotating the rims of valves associated with valves and the like. Conventional valve wrenches typically include a gripping handle associated with one or more attachment means configured to grip the rim of the valve. After secured to the rim, force is applied to the valve wrench, which in turn rotates that valve. This feature provides significant advantages, namely, the valve wrench is configured to provide additional rotational leverage, thereby creating sufficient torque moment to rotate the valve.

U.S. Pat. No. 2,539,262 to Moore is one known embodiment indicative of a current state-of-the-art valve wrench. In FIG. 1, a front view of a valve 101 is shown having a rim 103 and a plurality of spokes 105. In FIG. 2, a side view of the Moore tool 201 is shown with valve 101. The Moore tool 201 comprises of a handle 203 that bifurcates into two grips 205 and 207. The two grips are configured to partially wrap around rim 103 in opposing directions and apply horizontal forces D1 and D2 as a downward force D3 is created by the user, resulting in the valve rotating in direction D4.

It should be noted that the Moore tool is configured to utilize solely the rim and not the spokes during the rotation process. Further, it should be noted that the Moore tool, along with other tools commonly known in the art, is not configured to utilize opposing ends of the rim, e.g., at positions A and B, to rotate valve 101. This feature greatly reduces the amount of force applied to the valve.

Although the foregoing developments in handles for valves represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
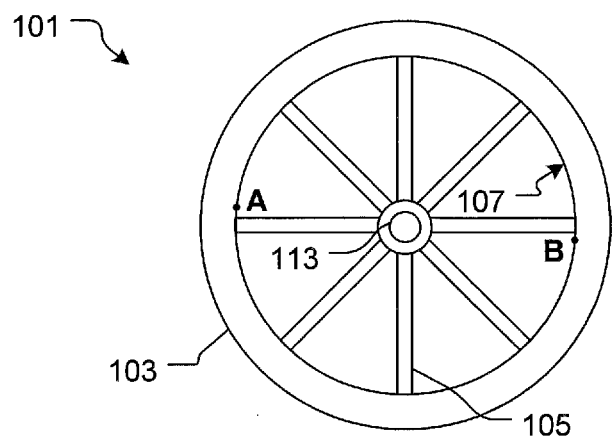
FIG. 1 is a front view of a conventional valve.
Figure 2:
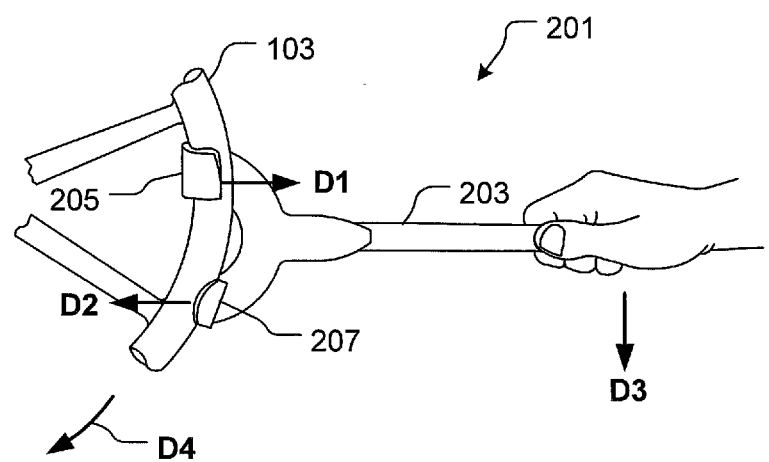
FIG. 2 is a conventional valve turning tool.

While the apparatus and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with apparatus-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The valve wrench of the present application overcomes the above-listed problems commonly associated with conventional valve wrenches and the like. Specifically, the valve wrench is adjustable, which enables the valve wrench to be utilized on valves having various diameters. Further, the valve wrench utilizes opposing sides of the rim, e.g., positions A and B of rim 103, along with the option of utilizing the spokes to rotate the valve. These features, along with the other features discussed herein, provide significant advantages over conventional valve wrench tools. Further detailed description of these features are provided below and illustrated in the accompanying drawings.

The apparatus and method of the present application will be understood, both as to its structure and operation, from the accompanying drawings, taken in conjunction with the accompanying description. Several embodiments of the apparatus are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 3:
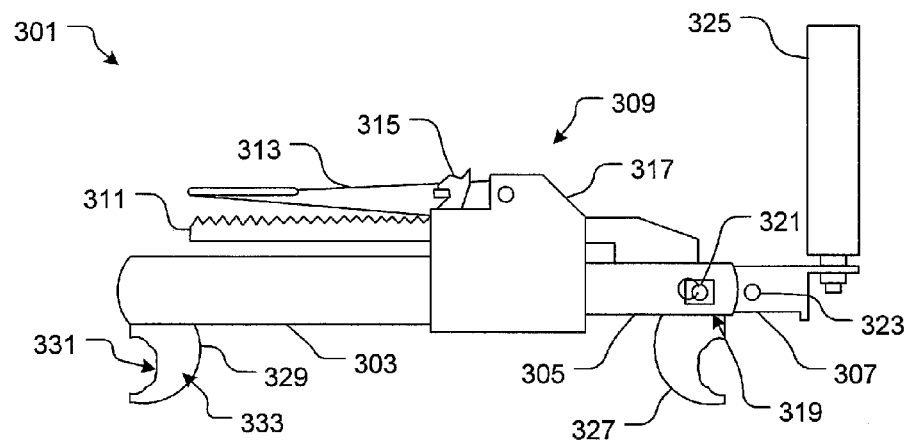
FIGS. 3 and 4 are side views of an adjustable valve wrench according to a preferred embodiment of the present application.
Figure 4:
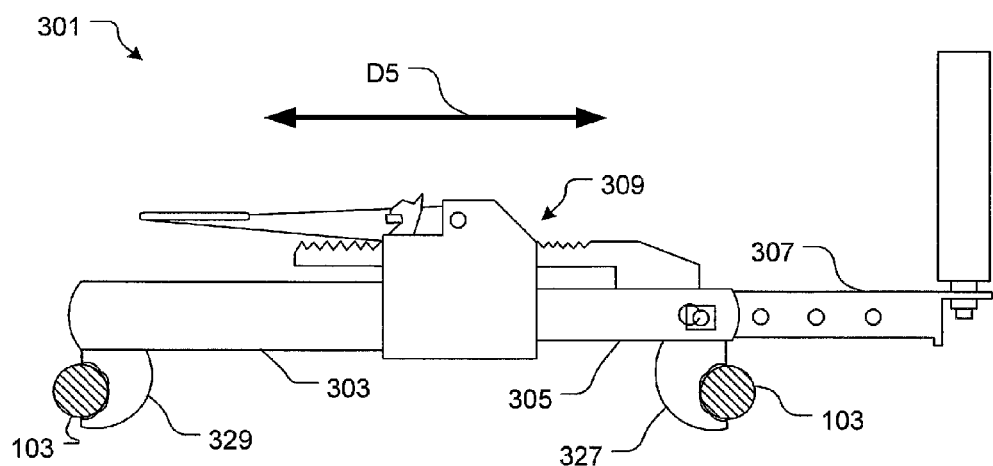

Referring now to the drawings wherein like reference characters identify corresponding or similar elements throughout the several views, FIGS. 3 and 4 depict side views of handle 301 in accordance with a preferred embodiment of the present application. Although shown associated with a valve 101 configuration, handle 301 could also be utilized with different types of valves and valves having different shapes and sizes, for example, valves that have various rim diameters.

Valve wrench 301 preferably includes one or more of a sleeve 303 that receives an insert 305, which in turn receives a handle extension 307. As depicted in FIG. 4, the sleeve, insert, and extension are adjustable relative to each other, as depicted with arrow D5. Thus, the extension/retraction of these members allows the valve wrench to accommodate valve rims having various diameters. In the contemplated embodiment, sleeve 303, insert 305, and extension 307 have cylindrical shapes and are configured to slidingly engage within each other.

Valve wrench 301 is further provided with a locking mechanism 309 configured to lock insert 305 in a fixed position relative to sleeve 303. In the contemplated embodiment, locking mechanism 309 is a ratchet-type mechanism having a cantilevered member 311 with a plurality of locking teeth, a lever 313, and a lock 315. During use, insert 305 is extended/retracted in direction D5 within sleeve 303, which in turn moves member 311 within housing 317. The teeth associated with member 311 interlock with a locking mechanism (not shown) disposed within housing 317 until a desired extension is made. Thereafter, lever 313 is utilized to secure the position by application of a force D6.

It will be appreciated that the ratchet-type mechanism contemplated in the preferred embodiment is one of many different types of means for locking the insert relative to the sleeve. Other embodiments could utilize a cam-style mechanism that simply incorporates a pivot lever that interlocks the two members together. One advantage of the ratchet-type locking mechanism is the ability to apply significant forces in direction D5, which in turn provides for a tight grip against the inner surfaces 107 of valve 101 (see FIG. 1).

Insert 305 also utilizes a pin lock 319 to secure extension 307 in a fixed position within insert 305. Pin lock 319 incorporates a pin 321 that extends through the insert and through a hole 323 extending through extension 307. During use, the extension 307 is extended/retracted to a desired position relative to insert 305, then pin 321 is passed through the insert and hole 323 to lock the extension in a desired position. Finally, a ring passes through a hole (not shown) of pin 321 for retention.

It will be appreciated that an adjustable extension 307 provides means to create a greater extension, which in turn creates a larger torque moment on valve 101. The adjustable handle extension also allows the user to manipulate the length of handle 301 when space is limited, e.g., multiple valves are close in proximity and adjacent to each other.

A gripping handle 325 is used to manipulate valve wrench 301 and is configured to extend from extension 307. During use, the user applies rotational force to handle 325 and rotates valve wrench 301 in direction D4. In the contemplated embodiment, gripping handle 325 is rotatably attached to extension 307. It will be appreciated that alternative embodiments could utilize different devices in lieu of a handle, for example, a block that a hammer can hit against (see FIG. 5).

One of the unique features believed characteristic of handle 301 is the feature of adjusting the distance of two clamps 327 and 329 relative to each other to apply a force against the inner surface 107 of rim 103. To achieve this feature, clamp 327 is either integral or rigidly attached to an outer surface of insert 305, while clamp 329 is either integral or rigidly attached to an outer surface of sleeve 303. As discussed, the sleeve and insert are adjustable to each other, which in turn enables the clamps to be adjustably positioned relative to each other in a fixed position.

When attached, clamps 327 and 329 are configured to grip the inner surface of the rim, for example, at positions A and B (see FIG. 1). Clamp 329 is shown having a gripping surface 331 configured to grip rims having various sizes. Clamp 329 also includes a surface 333 that is preferably utilized to apply a force against the spoke 105. Thus, in the contemplated embodiment, handle 301 applies a force against both the rim and spoke of the valve via the clamps. It will be appreciated that the features of clamp 329 are also shared with clamp 327, thereby allowing handle 301 to apply rotational force against valve 101 at two opposing positions on rim 103 and simultaneously against two spokes 105.

Figure 5:
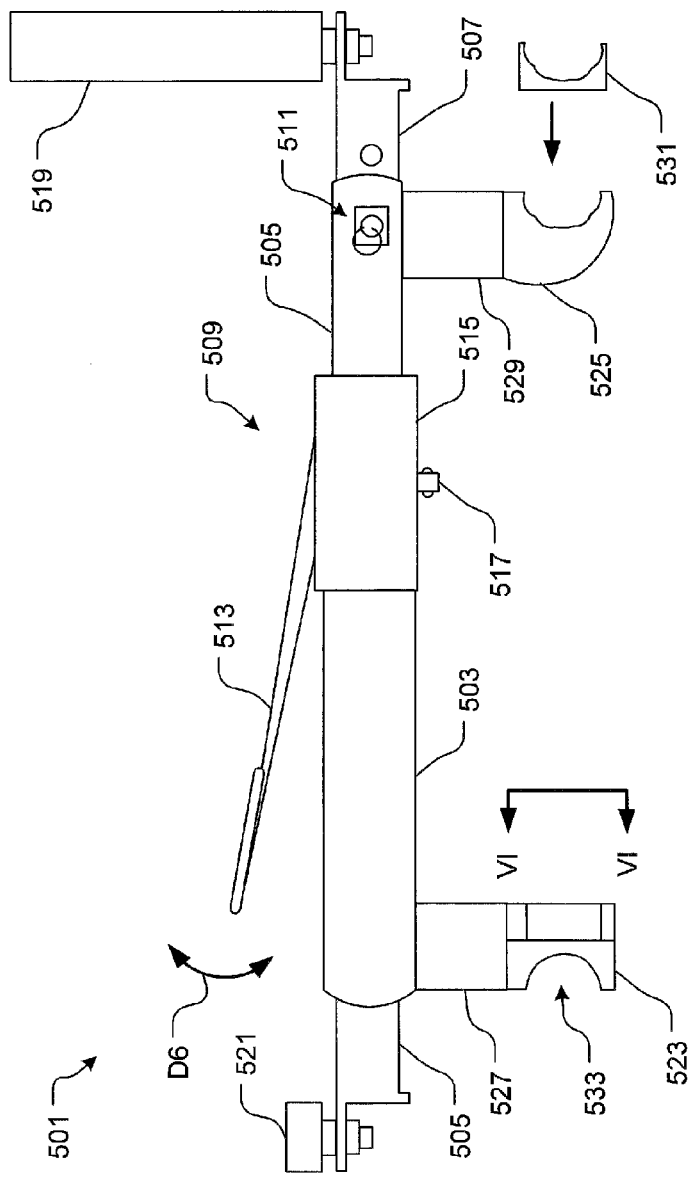
FIGS. 5 and 6 are side views of an alternative embodiment of the adjustable valve wrench of FIG. 3.
Figure 6:
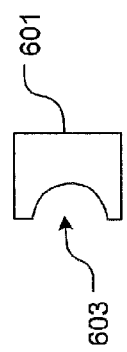

Referring next to FIGS. 5 and 6 in the drawings, an alternative embodiment of handle 301 is depicted. Handle 501 is substantially similar in form and function to handle 301, and it will be appreciated that the features discussed herein with respect to the two embodiments could be interchangeably shared.

Like valve wrench 301, valve wrench 501 preferably comprises one or more of a sleeve 503 that interlocks with an insert 505. In this embodiment, extension 507 passes through the entire length of insert 505, which in turn allows the user to manipulate valve wrench 301 with two hands. A locking mechanism 509 is used to lock insert 505 within sleeve 503, and a lock pin device 511 is used to lock the position of extension 507 relative to insert 505. Like handle 301, the sleeve, insert, and extension slidingly engage with each other and are interlocked via a locking mechanism and a pin lock.

In the exemplary embodiment, a cam-type locking mechanism 509 is utilized to secure the insert relative within the sleeve. A lever 513 is used to lock the insert in a fixed position; the rotational movement of the lever being shown as arrow D6. During use, the lever pivots about a pivot point within housing 515 and applies pressure against the outer surface of insert 505, which in turn prevents transverse sliding movement of the insert relative to the sleeve.

One optional feature of handle 501 is attaching a socket attachment 517 to housing 515 and/or any other component of handle 501. The socket attachment 517 could be a square or hex-socket attachment configured to attach with other tools.

Extension 507 provides at least two means for applying rotational movement of handle 501. In the exemplary embodiment, a gripping handle 519 is positioned on one end of extension 507, while a knob 521 and/or handle is positioned on the opposing end. It will be appreciated that knob provides a surface for applying force, e.g., a hammer strike, thereagainst. Other devices are also contemplated in lieu of the desired knob 521, for example, a rotatable knob that allow quick turning access.

Handle 501 is further provided with two clamps 523 and 525 that are extended from respective sleeve 503 and insert 505 via extension members 527 and 529. The grip extensions are configured to space the sleeve, insert, and handle extension at a position relative to the valve rim, which is advantageous in applications where valves includes members protruding from the valve center.

A protective sleeve 531 could be utilized in the contemplated embodiment for protecting the claims against wear and/or to protect the rim of the valve against damage during use.

Referring to FIG. 6, a side view taken at VI-VI of FIG. 5 illustrates clamp 523 having a secondary clamp 601 extending relative perpendicular to the gripping surface area 533. Clamp 601 includes a gripping surface 603 that is contoured to fit against and to apply a force against spoke 105. Thus, the contemplated embodiment includes two gripping surfaces areas to apply force simultaneously against the inner surface of the rim and a spoke. It will be appreciated that clamp 525 could also include the features of clamps 523 and 601.

It is apparent that an apparatus and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A valve wrench for attachment to a rim and a spoke of a valve, comprising:
   a handle extension;
   an insert having a configuration to adjustably receive the handle extension, the insert having a second clamp;

a sleeve having a configuration to adjustably receive the insert, the sleeve having a first clamp; and a locking mechanism having a configuration to interlock the insert relative to the sleeve;

a secondary clamp extending from the first clamp and having a gripping surface area contoured to engage with the contouring of the spoke wherein the first clamp and the second clamp have a configuration to grip an inner surface of the rim and the secondary clamp having a configuration to grip the spoke;

wherein the insert grips a first position along the rim of the valve; and wherein the sleeve grips a second position along the rim of the valve, the second position opposing the first position.

2. The valve wrench of claim 1, further comprising:

a pin-lock mechanism associated with the handle extension and the insert;

wherein the pin lock mechanism is having a configuration to lock the handle in a desired position relative to the insert.

3. The valve wrench of claim 2, the pin-lock mechanism comprising:

a pin having a configuration to extend through a first hole passing through a thickness of the insert and a second hole passing through a thickness of the handle extension.

4. The valve wrench of claim 1, further comprising:

a gripping handle attached to the handle extension.

5. The valve wrench of claim 1, wherein the handle extension slidingly engages within the insert.

6. The valve wrench of claim 1, wherein the insert slidingly engages with the sleeve.

7. The valve wrench of claim 1, wherein the locking mechanism is a ratchet.

8. The valve wrench of claim 7, the locking mechanism, comprising:

a cantilevered tooth member attached to the insert; and a locking lever attached to the sleeve.

9. A valve wrench for attachment to a rim and a spoke of a valve, comprising:

a handle extension;

an insert having a configuration to adjustably receive the handle extension;

a clamp having a configuration to grip an inner surface of the rim;

a secondary clamp extending from the clamp and having a configuration to engage with the spoke of the rim;

a sleeve having a configuration to adjustably receive the insert, the sleeve having:

a clamp having a configuration to grip an inner surface of the rim; and a locking mechanism having a configuration to interlock the insert relative to the sleeve;

wherein the insert grips a first position along the rim of the valve; and wherein the sleeve grips a second position along the rim of the valve, the second position opposing the first position.

10. The valve wrench of claim 9, further comprising:

a pin-lock mechanism associated with the handle extension and the insert;

wherein the pin lock mechanism having a configuration to lock the handle in a desired position relative to the insert.

11. The valve wrench of claim 10, the pin-lock mechanism comprising:

a pin having a configuration to extend through a first hole passing through a thickness of the insert and a second hole passing through a thickness of the handle extension.

12. The valve wrench of claim 9, further comprising:

a gripping handle attached to the handle extension.

13. The valve wrench of claim 9, wherein the handle extension slidingly engages within the insert.

14. The valve wrench of claim 9, wherein the insert slidingly engages with the sleeve.

15. The valve wrench of claim 9, wherein the locking mechanism is a ratchet.

16. The valve wrench of claim 15, the locking mechanism, comprising:

a cantilevered tooth member attached to the insert; and a locking lever attached to the sleeve.

\* \* \* \* \*